(12) United States Patent
Zhou et al.

(10) Patent No.: US 12,128,501 B2
(45) Date of Patent: Oct. 29, 2024

(54) METHOD FOR PREPARING SUPERHYDROPHOBIC SURFACE OF ALUMINUM ALLOY THROUGH LASER PEENING

(71) Applicant: Jiangsu University, Jiangsu (CN)

(72) Inventors: Jianzhong Zhou, Jiangsu (CN); Lei Huang, Jiangsu (CN); Yanqiang Gou, Jiangsu (CN); Xiankai Meng, Jiangsu (CN); Shu Huang, Jiangsu (CN); Pengfei Li, Jiangsu (CN); Li Li, Jiangsu (CN); Gaoqiang Jiang, Jiangsu (CN); Xu Feng, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/286,758

(22) PCT Filed: Jul. 8, 2022

(86) PCT No.: PCT/CN2022/104479
§ 371 (c)(1),
(2) Date: Oct. 12, 2023

(87) PCT Pub. No.: WO2023/098084
PCT Pub. Date: Jun. 8, 2023

(65) Prior Publication Data
US 2024/0189945 A1    Jun. 13, 2024

(30) Foreign Application Priority Data

Dec. 1, 2021   (CN) .......................... 202111455045.4

(51) Int. Cl.
| | | |
|---|---|---|
| *B23K 26/356* | (2014.01) | |
| *C21D 10/00* | (2006.01) | |
| *C22C 21/00* | (2006.01) | |
| *C23C 22/02* | (2006.01) | |
| *C23C 22/05* | (2006.01) | |
| *B23K 101/34* | (2006.01) | |
| *B23K 103/10* | (2006.01) | |

(52) U.S. Cl.
CPC .......... *B23K 26/356* (2015.10); *C21D 10/005* (2013.01); *C22C 21/00* (2013.01);
(Continued)

(58) Field of Classification Search
CPC .............. B23K 26/122; B23K 26/3584; B23K 26/3568; B23K 26/356
See application file for complete search history.

(56) References Cited

U.S. PATENT DOCUMENTS 11,219,922 B1 *   1/2022   Straka ...................... B05D 1/60
11,753,694 B1 *   9/2023   Zhou .................... C21D 10/005
                                                                      148/565
(Continued)

FOREIGN PATENT DOCUMENTS

CN   109881195   6/2019
CN   110170747   8/2019
(Continued)

OTHER PUBLICATIONS

Machine translation of CN-11345101-A (Year: 2024).*
(Continued)

*Primary Examiner* — Geoffrey S Evans
(74) *Attorney, Agent, or Firm* — JCIPRNET

(57) ABSTRACT

The present disclosure provides a method for preparing a superhydrophobic surface of an aluminum alloy through laser peening, including the following steps: coating a surface of the aluminum alloy as an absorption layer with an organic component-containing confinement layer to obtain a coated aluminum alloy, where the organic component-containing confinement layer is a mixed organic solution including 5 mL to 10 mL of perfluorooctyltriethoxysilane (FOTS), 100 mL to 200 mL of absolute ethanol, and 30 mL to 50 mL
(Continued)

of distilled water; and subjecting a surface of the coated aluminum alloy to the laser peening to form the superhydrophobic surface.

5 Claims, 3 Drawing Sheets

(52) U.S. Cl.
CPC .............. *C23C 22/02* (2013.01); *C23C 22/05* (2013.01); *B23K 2101/35* (2018.08); *B23K 2103/10* (2018.08); *C23C 2222/20* (2013.01)

(56) References Cited

U.S. PATENT DOCUMENTS

| | | | |
|---|---|---|---|
| 11,839,934 B1* | 12/2023 | Zhou | B23K 26/3568 |
| 2014/0314995 A1 | 10/2014 | Liu et al. | |
| 2021/0086302 A1* | 3/2021 | Matthews | B23K 26/0734 |
| 2022/0097175 A1* | 3/2022 | Xue | C22F 1/04 |

FOREIGN PATENT DOCUMENTS

| | | | |
|---|---|---|---|
| CN | 112894143 | | 6/2021 |
| CN | 113146049 | | 7/2021 |
| CN | 113308600 | | 8/2021 |
| CN | 113445101 A | * | 9/2021 |
| CN | 113621788 | | 11/2021 |
| CN | 113714646 | | 11/2021 |
| CN | 114406475 | | 4/2022 |

OTHER PUBLICATIONS

"International Search Report (Form PCT/ISA/210) of PCT/CN2022/104479," mailed on Aug. 30, 2022, with English translation thereof, pp. 1-4.

* cited by examiner

METHOD FOR PREPARING SUPERHYDROPHOBIC SURFACE OF ALUMINUM ALLOY THROUGH LASER PEENING

CROSS-REFERENCE TO RELATED APPLICATION

This application is a 371 of international application of PCT application serial no. PCT/CN2022/104479, filed on Jul. 8, 2022, which claims the priority benefit of China application no. 202111455045.4, filed on Dec. 1, 2021. The entirety of each of the above-mentioned patent applications is hereby incorporated by reference herein and made a part of this specification.

TECHNICAL FIELD

The present disclosure relates to the fields of laser processing and material science, and specifically to a method for preparing a superhydrophobic surface of an aluminum alloy through laser peening.

RELATED ART

Aviation aluminum alloy is an important material for manufacture of skin, skeleton, wing ribs, and other key components for aircraft. The preparation of a superhydrophobic surface of an aviation aluminum alloy material can effectively slow down the surface icing of aircraft due to a low temperature during a high-altitude flight, and can also make a surface of aircraft have a self-cleaning function.

Currently, there are many methods for preparing a superhydrophobic surface, and common preparation methods include chemical etching, electrochemical deposition, hydrothermal synthesis, vapor deposition, or the like. These methods have their respective limitations, such as poor mechanical stability of a manufactured micro-nano structure, complicated process, and difficult large-scale preparation, and thus can hardly be used in the aviation field involving complicated stresses.

As a method for preparing a superhydrophobic surface, laser processing has characteristics such as environmental friendliness, high efficiency, and stability, and can directly prepare a specific micro-nano structure on a metal surface to allow preparation of a superhydrophobic surface of a material. Laser processing has received widespread attention in recent years. For example, a method for preparing a superhydrophobic metal surface is provided in the prior art, where a polished metal surface is ablated by a laser with parameters and a processing path set to prepare a micro-scale parallel-groove structure required for preparing a superhydrophobic surface, and then subjected to an ultrasonic treatment and a hydroxylation treatment with an acid solution to obtain a superhydrophobic surface with a hydrophobic angle as high as 170° C.; and a method for preparing a metal-based superhydrophobic surface with enhanced dropwise condensation heat transfer is provided, where a laser ablation technology is used to ablate a metal surface with a polyimide (PI) tape to obtain a micro-groove structure with carbonized PI particles deposited, which allows one-step preparation of a superhydrophobic texture on the metal surface. Due to characteristics such as very fast heating and instantaneous cooling of a laser ablation process, a micro/nano structure manufactured by laser ablation has specified brittleness, and a tensile stress will occur on a surface of and inside a remelted layer, which results in a low mechanical strength and poor stability, and reduces the mechanical properties of an aviation aluminum alloy matrix material.

SUMMARY OF INVENTION

In view of the shortcomings in the prior art, the present disclosure provides a method for preparing a superhydrophobic surface of an aluminum alloy through laser peening. In the present disclosure, the traditional laser peening process is improved, and an absorption layer of laser peening is changed to a surface of a material, such that a laser is directly irradiated on the surface of the material; clear water in the traditional flow-water confinement layer is changed to an organic solvent, and the morphology and composition of a prepared superhydrophobic surface can be adjusted by adjusting parameters of laser peening and a composition of the organic solution; and laser peening produces a shock wave of a GPa magnitude, such that near-surface grains of a material are effectively refined and a high residual compressive stress is introduced inside the material, which can improve the mechanical properties of the material. Therefore, the preparation method provided by the present disclosure can simultaneously allow the preparation of a superhydrophobic surface and the strengthening of a material.

The present disclosure achieves the above technical objective through following technical solutions.

A method for preparing a superhydrophobic surface of an aluminum alloy through laser peening is provided, including the following steps: coating a surface of the aluminum alloy as an absorption layer with an organic component-containing confinement layer to obtain a coated aluminum alloy, where the organic component-containing confinement layer is a mixed organic solution including 5 mL to 10 mL of perfluorooctyltriethoxysilane (FOTS), 100 mL to 200 mL of absolute ethanol, and 30 mL to 50 mL of distilled water; and subjecting a surface of the coated aluminum alloy to the laser peening to form the superhydrophobic surface.

Further, the method further includes the following step: drying a surface of an aluminum alloy workpiece obtained after the laser peening at a constant temperature to improve bonding of a surface material to a low-free-energy functional group.

Further, the method further includes the following step: incubating the surface of the aluminum alloy workpiece for 10 min to 20 min in an environment at 80° C. to 100° C.

Further, a spot size of the laser peening is 0.5 mm to 2 mm, a shock manner of the laser peening is multi-point-lap large-area shock, and a lap rate of the laser peening is 30% to 80%.

Further, the laser peening is conducted with a laser beam wavelength of 1.064 nm, a pulse width of 8 ns, a repetition frequency of 1 Hz to 10 Hz, a single pulse energy of 2 J, and a Gaussian distribution.

The present disclosure has the following advantages.

1. In the method for preparing the superhydrophobic surface of the aluminum alloy through laser peening provided in the present disclosure, a thermal effect produced by laser peening can make a surface of the aluminum alloy undergo complicated physical and chemical reactions such as gasification and liquefaction, and the combination of a force effect and a thermal effect of laser peening makes a porous micro-nano multi-level structure formed on a surface of the aluminum alloy, such that a surface material of the aluminum alloy has superhydrophobicity. A composition of a flow-water confinement layer in the traditional laser peening process is changed to an organic solution, and due to a thermal effect of laser peening and an ultra-high temperature and ultra-high pressure environment produced, a surface material of the aluminum alloy reacts with an organic substance in the confinement layer, such that a low-free-energy functional group is bonded to a surface of the aluminum alloy to reduce a surface energy of the material. A combined action of the resulting porous micro/nano structure and the reduced surface energy can make a surface of the aluminum alloy have an excellent superhydrophobic effect. The improved laser peening process not only has an impact on the surface morphology and surface energy of an aluminum alloy, but also causes a high-strain-rate plastic deformation on a near-surface layer (less than or equal to 500 μm) of the material due to a shock wave generated by a high-pressure plasma explosion of laser peening, such that a high-density dislocation structure and a large number of deformation twins are produced inside the material, structure grains are significantly refined, the mechanical stability of a hydrophobic structure is enhanced, and the fatigue performance of the aluminum alloy with a hydrophobic structure is also improved. The preparation method provided by the present disclosure can simultaneously allow the preparation of a superhydrophobic surface of an aluminum alloy and the strengthening of the material.

2. The method for preparing the superhydrophobic surface of the aluminum alloy through laser peening provided in the present disclosure can efficiently allow the preparation of a superhydrophobic surface of an aluminum alloy and the strengthening of a material matrix and the accurate control of parameters of a laser and a composition of a confinement layer, and has excellent processing quality, repeatability, and flexibility and a high automation level.

3. The method for preparing the superhydrophobic surface of the aluminum alloy through laser peening provided in the present disclosure can simultaneously allow the strengthening of a matrix material and the preparation of a hydrophobic functional surface, is simple and efficient, and can lead to an excellent hydrophobic effect; and a porous micro-nano structure prepared by the method has high reliability and stability, which can effectively promote the application of a method for preparing a superhydrophobic functional surface of an aluminum alloy in the aerospace field.

DESCRIPTION OF EMBODIMENTS

The present disclosure will be further described below in conjunction with the accompanying drawings and specific embodiments, but the protection scope of the present disclosure is not limited thereto.

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are intended to explain the present disclosure, but should not be construed as a limitation to the present disclosure.

It should be understood that, in the description of the present disclosure, the terms such as "central". "longitudinal". "transverse". "length", "width". "thickness". "upper". "lower", "axial", "radial". "vertical". "horizontal". "inner", and "outer" are intended to indicate orientation or position relationships shown in the accompanying drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure. In addition, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure. "a plurality of" means two or more, unless otherwise specifically defined.

In the present disclosure, unless otherwise clearly specified and defined, meanings of terms "arrangement". "connected with". "connected to", and "fixed to" should be understood in a broad sense. For example, the connection may be a fixed connection, a removable connection, or an integral connection; may be a mechanical connection or an electrical connection; may be a direct connection or an indirect connection through an intermediate medium; or may be intercommunication between two components. Those of ordinary skill in the art may understand specific meanings of the above terms in the present disclosure based on specific situations.

Figure 1:
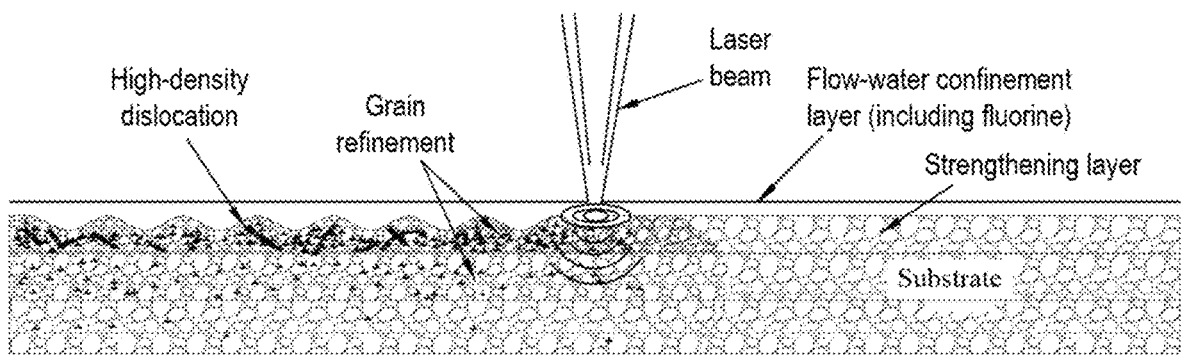
FIG. 1 is a strengthened schematic diagram of the method for preparing the superhydrophobic surface of the aluminum alloy through laser peening provided in the present disclosure.

As shown in FIG. 1, in the method for preparing a superhydrophobic surface of an aviation aluminum alloy through laser peening in the present disclosure, a porous micro-nano structure is produced on a surface of the aluminum alloy due to a thermal effect of the laser peening, and a composition of a flow-water confinement layer of the laser peening is changed, such that a surface material of the aluminum alloy is firmly bonded to a low-free-energy functional group in an ultra-high temperature and ultra-high pressure environment generated by the laser peening, and a surface energy of the aluminum alloy is reduced. The acquisition of the porous micro-nano structure and low surface energy on the surface of the material makes the surface of the aluminum alloy have excellent hydrophobic properties. Due to a shock wave of a GPa magnitude generated by the laser peening, a large number of dislocation structures are generated in a material below the porous micro-nano structure, grains are refined, and a high residual compressive stress is also introduced into the material, such that the prepared superhydrophobic surface has ultra-high mechanical stability. A 2024-T351 aluminum alloy is selected as a research object, and the present disclosure is described in detail in conjunction with the accompanying drawings and three specific examples.

Example 1

S01: A 2024-T351 aluminum alloy sheet was prepared into a 15 mm×15 mm×2 mm square workpiece through wire cutting; and then a surface of the workpiece to be treated was polished with 400 #. 800 #. 1000 #, 1500 #, and 2000 #sand papers to obtain a smooth mirror surface, and finally the workpiece with a polished surface was ultrasonically cleaned in an alcohol solution to remove unnecessary impurities on the surface of the workpiece.

Figure 2:
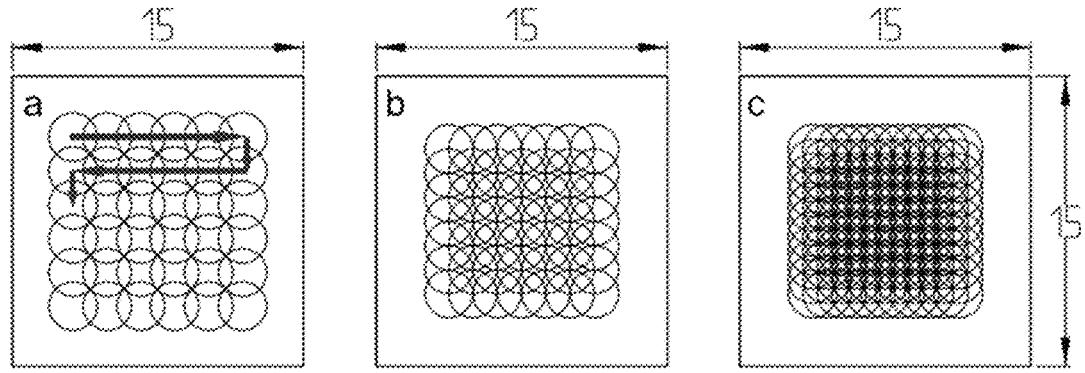
FIG. 2 is a schematic diagram of laser peening pathways at different lap rates on a superhydrophobic surface of an aviation aluminum alloy prepared by the laser peening in the present disclosure.

S02: The treated aluminum alloy workpiece was arranged on a fixture for laser peening, and the surface of the aluminum alloy workpiece was set as an absorption layer and coated with a mixed organic solution including 5 mL of FOTS. 100 mL of an ethanol solution, and 50 mL of distilled water to form a 2 mm-thick organic solution confinement layer; output parameters of a Nd:YAG solid-state laser were set as follows: wavelength: 1,064 nm, repetition frequency: 10 Hz, pulse width: 8 ns, single pulse energy: 1.5 J, inter-row and inter-column spot lap rates: 20%, and laser spot diameter: 500 μm; and with a laser peening scanning pathway shown in a of FIG. 2 and an upper left corner of the aluminum alloy workpiece as a laser peening starting point, the surface of the aluminum alloy workpiece was subjected to laser peening by the laser to form a superhydrophobic surface of the aluminum alloy workpiece.

Figure 3:
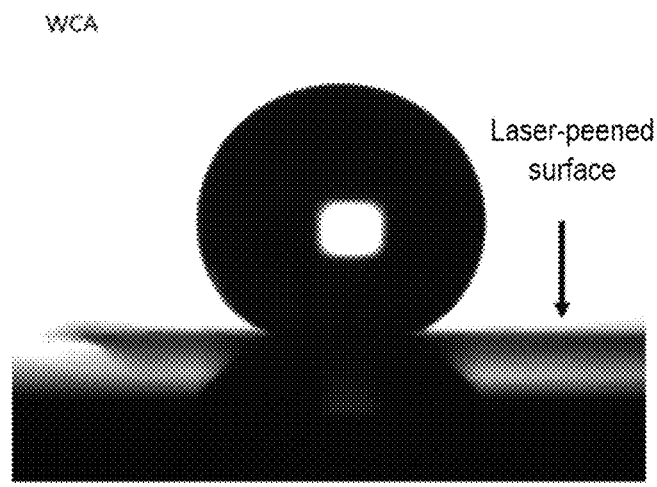
FIG. 3 is an image illustrating a droplet static contact angle (WCA) obtained in Example 1 of the present disclosure.
Figure 4:
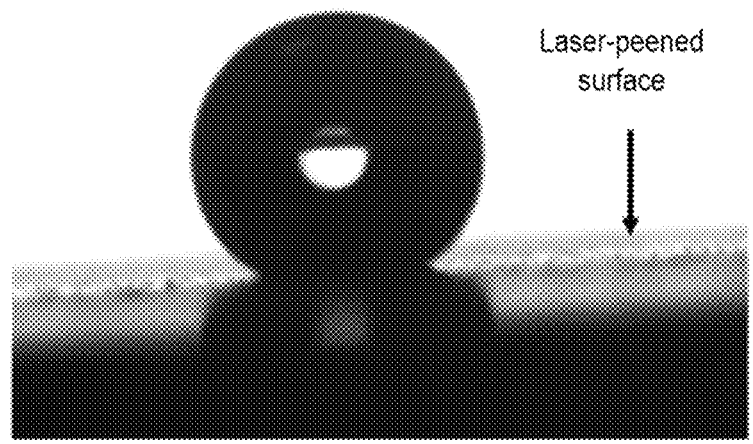
FIG. 4 is an image illustrating a droplet sliding angle (SA) obtained in Example 1 of the present disclosure.
Figure 5:
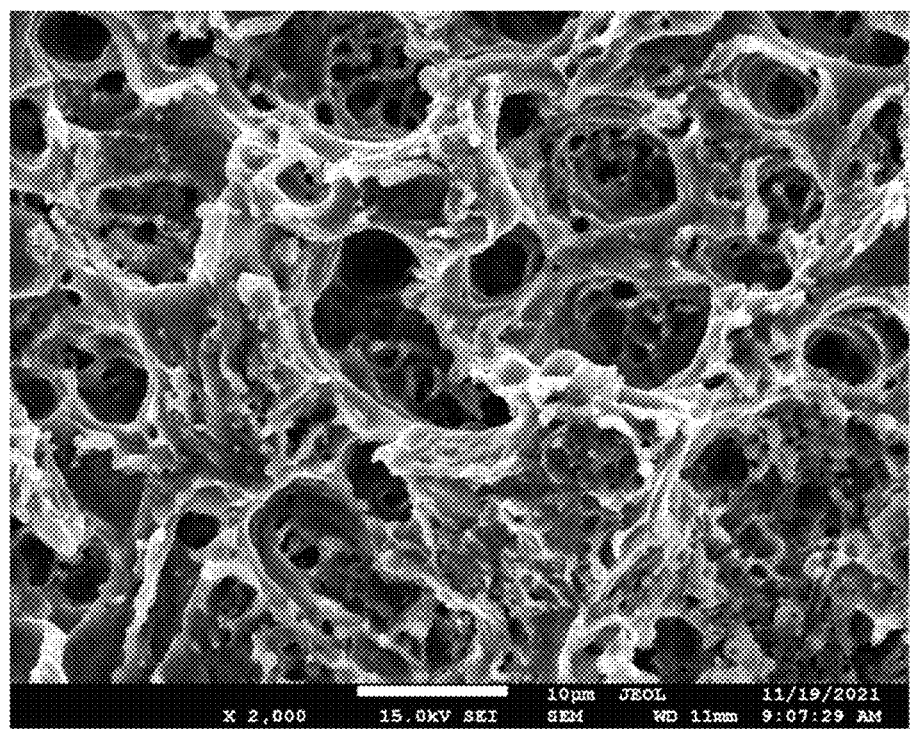
FIG. 5 is a scanning electron microscopy (SEM) image of a porous micro-nano structure obtained in Example 1 of the present disclosure.
Figure 6:
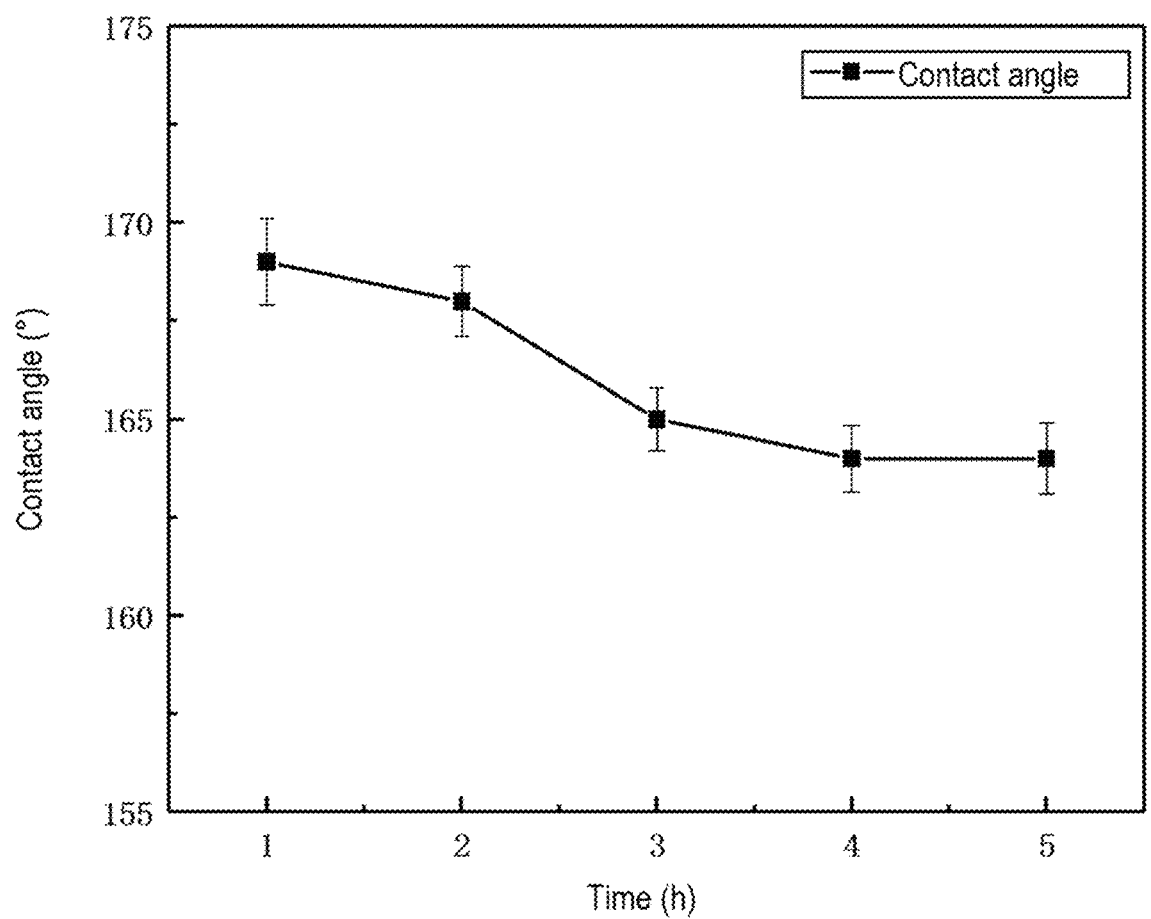
FIG. 6 shows a change curve of a droplet contact angle of a prepared superhydrophobic surface under different ultrasonic treatment times in Example 1 of the present disclosure.

S03: After the laser peening was completed, the aluminum alloy workpiece was placed in a drying oven at 80° C. for 10 min to remove excess moisture on a surface of the aluminum alloy workpiece and promote the further bonding of the surface of the aluminum alloy workpiece to a low-free-energy functional group, such that a surface energy of the aluminum alloy workpiece was further reduced, and a rough surface with a porous micro-nano structure was produced due to a laser thermal effect, which was a superhydrophobic surface of the aluminum alloy workpiece. In this example, a superhydrophobic surface was prepared for an aluminum alloy by an improved laser peening process, and as shown in FIG. 3 and FIG. 4, a contact angle of a droplet in a laser peening area was tested by an angular contact-measuring instrument to be 169.9°, and a sliding angle was tested to be 4°, indicating a prominent surface hydrophobic effect. The porous micro-nano structure can store a large amount of air, which can reduce a contact area of a droplet with the material. FIG. 5 shows the porous micro-nano structure of the superhydrophobic surface of the aluminum alloy prepared by laser peening, and it can be seen that a density of pores is large, which can provide a structural support for excellent hydrophobicity of the surface of the material. A change curve of a droplet contact angle on the prepared superhydrophobic surface of the aluminum alloy under different times of ultrasonic vibration was shown in FIG. 6. It can be seen that, with the increase of a vibration time for a sample, a contact angle decreases to some degree, which is related to destruction of the prepared porous micro-nano multi-level structure; after 5 h of ultrasonic vibration, a droplet contact angle can still reach 160° or more; and during 30 d placement of the prepared superhydrophobic surface of the aluminum alloy, a droplet contact angle was always observed to be about 169°, indicating that the prepared superhydrophobic surface of the aluminum alloy has high structural stability.

Example 2

S01: A surface of a 2024-T351 aluminum alloy workpiece prepared through wire cutting was polished with sand papers of different particle sizes, and then ultrasonically cleaned with an acetone solution for 5 min.

S02: The surface of the aluminum alloy workpiece was set as an absorption layer and coated with a mixed organic solution including 7 mL of FOTS. 150 mL of an ethanol solution, and 40 mL of distilled water to form a 2 mm-thick organic solution confinement layer; output parameters of a Nd:YAG solid-state laser were set as follows: wavelength: 1.064 nm, repetition frequency: 10 Hz, pulse width: 8 ns, single pulse energy: 2 J, inter-row and inter-column spot lap rates: 50%, and laser spot diameter: 500 μm; and with a laser peening scanning pathway shown in b of FIG. 2 and an upper left corner of the aluminum alloy workpiece as a laser peening starting point, laser peening was conducted by the laser to form a superhydrophobic surface of the aluminum alloy workpiece.

S03: After the laser peening was completed, the aluminum alloy workpiece was placed in a drying oven at 100° C. for 15 min to remove excess moisture on a surface of the aluminum alloy workpiece and promote the further bonding of the surface of the aluminum alloy workpiece to a low-free-energy functional group, such that a surface energy of the aluminum alloy workpiece was reduced, and a porous micro-nano structure was produced due to a laser thermal effect, which was a superhydrophobic surface of the 2024-T351 aluminum alloy workpiece.

The preparation process of a superhydrophobic surface of an aluminum alloy material in Example 2 was consistent with the preparation process of a superhydrophobic surface of an aluminum alloy material in Example 1, but parameters of laser peening and a composition of a confinement layer were adjusted, such that a porous micro-nano structure on a surface of the aluminum alloy material changed and thus a droplet contact angle changed. A static contact angle (WCA) of the prepared superhydrophobic surface of the aluminum alloy was tested by contact angle-measuring software to be 161.7°, and a dynamic sliding angle (SA) was tested to be 4.6°, indicating excellent hydrophobicity.

Example 3

S01: A surface of a 2024-T351 aluminum alloy material was polished successively with sand papers of different particle sizes, and then scratches and cracks on a polished surface were observed by a metallographic microscope; after the polished surface met requirements, the polished surface was further polished on a metallographic polishing machine until a roughness of the surface was less than or equal to 0.05 mm; and finally the polished surface was ultrasonically cleaned in an absolute ethanol solution.

S02: The surface of the aluminum alloy material was set as an absorption layer and coated with a mixed organic solution including 10 mL of FOTS. 200 mL of an ethanol solution, and 50 mL of distilled water to form a 2 mm-thick organic solution confinement layer; output parameters of a Nd:YAG solid-state laser were set as follows: wavelength: 1.064 nm, repetition frequency: 10 Hz, pulse width: 8 ns, single pulse energy: 2 J, inter-row and inter-column spot lap rates: 80%, and laser spot diameter: 1 mm; and with a laser peening scanning pathway shown in c of FIG. 2 and an upper left corner of the aluminum alloy material as a laser peening starting point, laser peening was conducted by the laser to form a superhydrophobic surface of the aluminum alloy workpiece.

S03: After the laser peening was completed, the surface of the 2024-T351 aluminum alloy material was dried in a drying oven at 90° ° C. for 20 min, such that a bonding rate between a surface material and a low-free-energy functional group increased, and a surface energy was further reduced, thereby making the surface of the aluminum alloy material superhydrophobic.

In Example 3, a spot lap rate for laser peening was 80%, and in order to improve the preparation efficiency, a spot diameter was 1 mm, making the porous micro-nano structure on the surface of the material dense. A static contact angle (WCA) of the prepared superhydrophobic surface of the aluminum alloy was tested by contact angle-measuring software to be 163.3°, and a dynamic sliding angle (SA) was tested to be 5.5°, indicating that the prepared superhydrophobic surface of the aluminum alloy has an excellent hydrophobic effect.

It should be understood that although this specification is described in accordance with the examples, not every example only includes one independent technical solution. This description of the specification is for the sake of clarity only. Those skilled in the art should take the specification as a whole, and the technical solutions in each example can also be appropriately combined to form other implementations that can be understood by those skilled in the art.

The series of detailed description listed above are only specific illustration of feasible examples of the present disclosure, rather than limiting the claimed scope of the present disclosure. All equivalent examples or changes made without departing from the technical spirit of the present disclosure should be included in the claimed scope of the present disclosure.

What is claimed is:

1. A method for preparing a superhydrophobic surface of an aluminum alloy through laser peening, comprising the following steps:

coating a surface of the aluminum alloy as an absorption layer with an organic component-containing confinement layer to obtain a coated aluminum alloy, wherein the organic component-containing confinement layer is a mixed organic solution comprising 5 mL to 10 mL of perfluorooctyltriethoxysilane, 100 mL to 200 mL of absolute ethanol, and 30 mL to 50 mL of distilled water; and subjecting a surface of the coated aluminum alloy to the laser peening to form the superhydrophobic surface, wherein due to a thermal effect of the laser peening and an ultra-high temperature and ultra-high pressure environment produced, the surface of the aluminum alloy reacts with an organic substance in the confinement layer, such that a low-free-energy functional group is bonded to the surface of the aluminum alloy to reduce a surface energy of the aluminum alloy, and a combined action of a resulting porous micro/nano structure and a reduced surface energy makes the surface of the aluminum alloy have a superhydrophobic effect.

2. The method for preparing the superhydrophobic surface of the aluminum alloy through the laser peening according to claim 1, further comprising the following step: drying and incubating a surface of an aluminum alloy workpiece obtained after the laser peening at a constant temperature to improve bonding of a surface material to the low-free-energy functional group.

3. The method for preparing the superhydrophobic surface of the aluminum alloy through the laser peening according to claim 2, wherein the surface of the aluminum alloy workpiece is incubated for 10 min to 20 min in an environment at 80° C. to 100° C.

4. The method for preparing the superhydrophobic surface of the aluminum alloy through the laser peening according to claim 1, wherein a spot size of the laser peening is 0.5 mm to 2 mm, a shock manner of the laser peening is multi-point-lap shock, and a lap rate of the laser peening is 30% to 80%.

5. The method for preparing the superhydrophobic surface of the aluminum alloy through the laser peening according to claim 1, wherein the laser peening is conducted with a laser beam wavelength of 1,064 nm, a pulse width of 8 ns, a repetition frequency of 1 Hz to 10 Hz, a single pulse energy of 2 J, and a Gaussian distribution.

* * * * *